United States Patent Office 3,136,072
Patented June 9, 1964

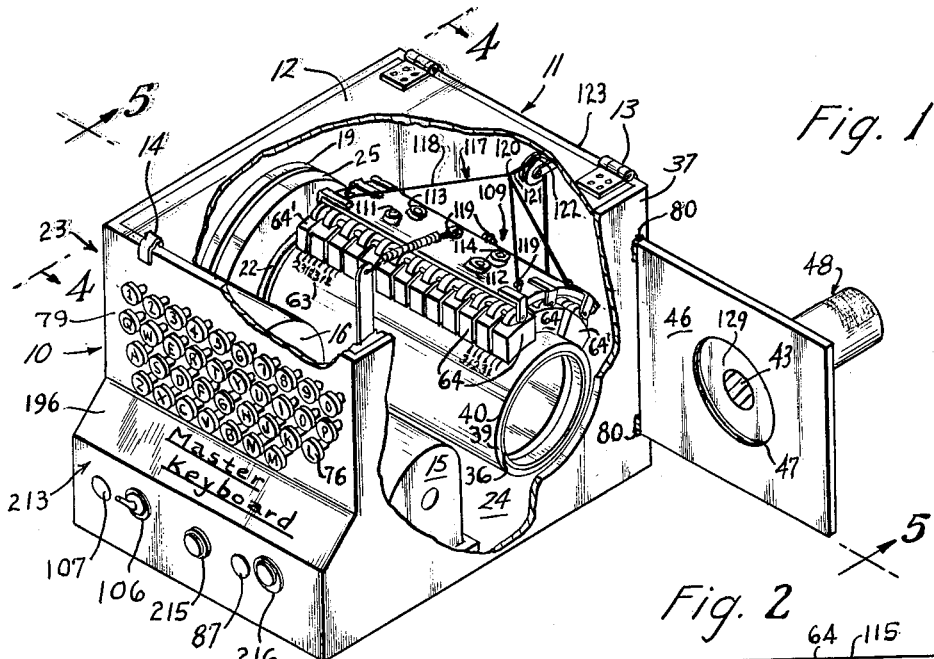

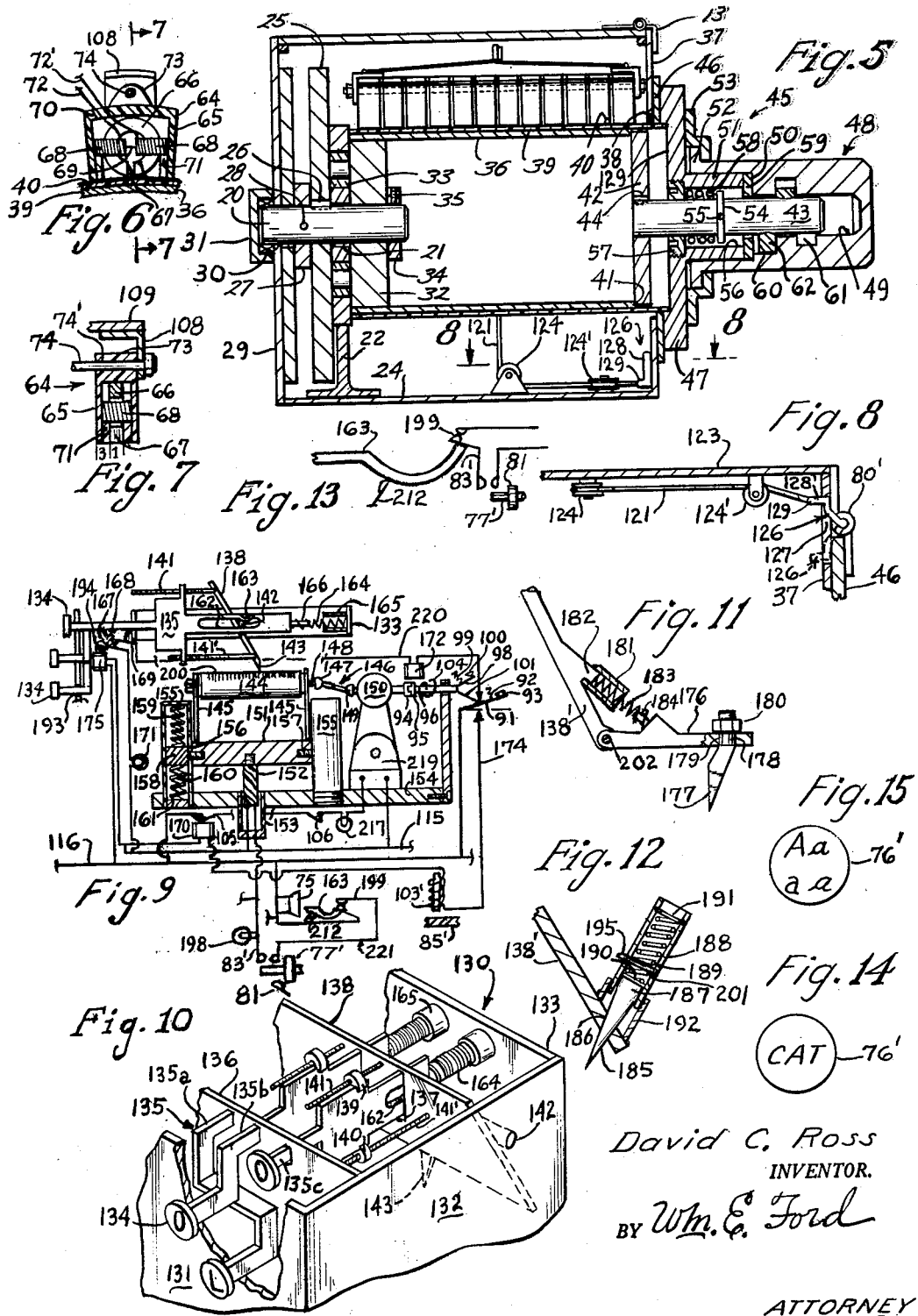

3,136,072
APPARATUS AND METHOD OF TEACHING CHILDREN THE ALPHABET, NUMBERS AND THE LIKE
David C. Ross, 130 Haywood Drive, Houston 17, Tex.
Filed Feb. 1, 1961, Ser. No. 86,542
3 Claims. (Cl. 35—5)

This invention relates to apparatus and method of teaching children the alphabet, numbers and the like.

The perception and reading education of children of pre-kindergarten ages can be enhanced by teaching them to make comparisons between the visual image of a printed word, letter, numeral, or image, and the auditory reflection corresponding therewith, especially if such auditory reflections may be repetitive. Additionally, pictures may be flashed corresponding with the image deemed comparative, thereby to render a visual check on the selection made.

As is known in teaching children of kindergarten and pre-kindergarten ages, there occurs an element of challenge to the underage pupil in making comparative selections, the challenge being vivified by a conception of accomplishment as matching of a printed character is answered by the sequential repetition of its sound.

Consequently, it is a primary object of this invention to provide means and method of teaching pre-kindergarten children the alphabet, numerals, words, and the like by having them match on a keyboard characters or images shown in a book designed for the purpose.

It is a further object of this invention to provide a teaching means and method of this class in which the pupil may be familiarized in advance of kindergarten age with the sound of a character corresponding with the visual appearance thereof.

It is also an object of this invention to provide a teaching means and method of teaching in which a character to be matched may be selected on a master keyboard and delineated thereon whereby the pupil is required to match the selected character on a selector keyboard which will not respond if the pupil is in error in selection and will only respond in case the right matching selection is made.

It is yet another object of this invention to provide a teaching means and method of teaching of this class in which the characters to be matched may be changed and accordingly the characters on the selector keyboard on which matching is conducted may be changed along with the sound-impressed tape or belt on the cylinder with which the belt rotates.

It is also an object of this invention to provide a teaching means and method of this class in which the length of the required cylinder may be reduced and its diameter increased accordingly by arranging pick-up coil units thereon in rows which are staggered relative to each other.

It is a further object of this invention to provide a teaching means and method of this class in which the longitudinal width of a pick-up coil unit is that multiple of a sound tract width corresponding to the number of rows of pick-up coil units.

It is a further object of this invention to provide an optional form thereof in which a single sound impressed cylinder is played by a single yieldably mounted, changeable needle to vocally reproduce a multiplicity of selected characters.

Other and further objects will be apparent when the specification herein is considered in connection with the drawings in which:

FIG. 1 is an isometric view of a preferred form of the invention with part of the top and walls cut away and showing the side door in open position, and with the latch shaft being shown cut away as indicated;

FIG. 2 is a view, part in section and part in diagram, showing the electrical and mechanical apparatus functioning at each actuation of a selector key, including electrical and mechanical apparatus which may be optionally included;

FIG. 3 is a fragmentary view of part of a page of a book included by the invention and showing the letters in words which letters are to be matched by the pressing of corresponding selector keys;

FIG. 4 is a longitudinal sectional elevation taken along line 4—4 of FIG. 1;

FIG. 5 is a transverse sectional elevation taken along line 5—5 of FIG. 1 with the side door in closed position;

FIG. 6 is a longitudinal sectional elevation through a pick-up coil corresponding with the pick-up coils shown in FIGS. 6 and 7, and showing a variation of pick-up coil mounting head;

FIG. 7 is a transverse sectional elevation taken along line 7—7 of FIG. 6;

FIG. 8 is a fragmentary sectional plan view taken along line 8—8 of FIG. 5;

FIG. 9 is a view, part in sectional elevation and partially diagrammatic, showing another form of the invention;

FIG. 10 is an isometric view showing details of selector key and cam arrangement of the form of invention shown in FIG. 9;

FIG. 11 is a view of one means of mounting the needle included by the form of the invention shown in FIG. 10;

FIG. 12 is a view of another means of mounting the needle included by the form of the invention shown in FIG. 10;

FIG. 13 is an enlarged detail view of the cam latch spring shown in FIG. 10, showing the switches closed thereby;

FIG. 14 is a variation of selector key indicia; and

FIG. 15 is a view of another variation of indicia on selector key.

Referring in detail to the drawings in which like reference numerals are assigned to like elements in the various views, an educational device 10 is shown in FIG. 1 having a housing 11 with a top or cover 12 hinged at 13 to open rearwardly, and having suitable latch cams or springs 14 on the housing front panel 23 to latch the top 12 in closed position.

Within the housing there is mounted a motor 15 and a speed reducer 16 to be driven thereby. The speed reducer has an upper shaft 17 and a lower shaft 18, shown in FIG. 4, extending from the end thereof opposite the motor 15. A hard rubber pinion or roller 19' is affixed to or molded upon the lower speed reducer shaft 18 to frictionally mesh with a much larger diameter roller or friction gear 19, also preferably of hard rubber, which is mounted as by molding, upon a shaft 20 which extends through a bushing 21, shown in FIG. 5, carried by an upright support or bracket 22 which upstands from the housing base 24. A flyweight 25 is fixed to the shaft 20, as by a key 26, such flyweight being of some suitable heavy material, as lead. A spacer 27 is affixed to the shaft 20 as by means of the pin 28 thereby to space the flyweight 25 from the friction roller 19. The outer end of the shaft 20 extends through the housing side panel 29 into a bushing 30 carried by a closure cup 31 which is rigidly fixed to the side panel 29.

The shaft 20 meshes with four friction idler pinions 32, preferably of hard rubber, mounted in bushings 33 in the support bracket 22, a suitable collar 34 being provided to hold the pinions upon the shaft 20, as by a set-screw 35. The pinions 32 contact the inner periphery of a cylinder 36 of suitable insulative material, as Bakelite or hard rubber, which is of length to extend from the support bracket 22 through the side panel 37 on the opposite side of the housing from the side panel 29.

As shown in FIG. 5, the side panel 37 has a bore 38 therethrough of diameter to permit the cylinder 36 and a sound impressed plastic belt or tape 39, carried thereby and mounted on the outer periphery of the cylinder, to be inserted with a slight tolerance through the bore 38, the outer surface of the belt or tape 39 being coated with a thin coating of iron oxide 40 for a purpose to be hereinafter described.

The outer end of the cylinder 36 is counterbored at 41, as shown in FIG. 5, to receive therein a support disc 42 which is carried by a latch shaft 43 to which the disc 42 is keyed at 44. The latch shaft is carried by a door assembly 45 which comprises elements assembled as follows: A door panel 46 is swingably connected to the side panel 37 by hinges 80 and 80' and is shown in FIG. 1 having a flange 47 mounted thereon with axis in co-extension with the axis of the cylinder 36 and a latching nut or knob 48 having a bore 49 and counterbore 50 is mounted to receive in its counterbore 50 the outwardly extending cylindrical boss 51 which forms the outer element of the flange 47. The knob 48 has a rim 52 which extends outwardly from its base and a split hold-down member 53 is fitted with its two parts in radial surface, diametral abutment. Suitable machine screws, not shown, are used to connect the hold-down members 53 to the flange 47, and also to fit the flange 47 to the panel 46.

The latch shaft 43 has a collar 54 pinned thereto by a pin 55 to be received within the bore 56 through the flange cylinder 51 and a nut 57 through which the latch shaft 43 extends is threadable into the inner face of the flange 47 to constrain a spring 58 between the collar 54 and the inner face of the nut 57. A washer 59 seats in the base of the counterbore 50. A spiral groove 60 communicates with the counterbore 50 and extends into the knob 48 for 90 degrees at the same outer diameter. The groove 60 is held to uniform axial width and cross-section throughout this 90 degrees, but a spiral cam 62 affixed to the shaft 43 tapers down from a wall to fit the radius of the groove adjacent the counterbore 50 to a substantially less or radial dimension 90 degrees therefrom. Then, in the next 90 degrees the spiral groove tapers down until at 61 the groove is at substantially the radius of the spiral cam at its smallest dimension.

When the knob 48 has been rotated to the right the spiral cam has been rotated 90 degrees from unlatched to its latched position as shown in FIG. 5, and this rotation has projected the disc 42 into the cylinder 36 to support it for rotation as the disc 42 fits into the counterbore 41. On the other hand, when the knob 48 is turned to the left 90 degrees, it moves the small end of spiral cam 62 to the small end 61 of the groove 60 and the disc 42 is withdrawn outwardly from the cylinder 36 as the spring 58 expands against the outwardly moving collar 54 until such collar rests upon the washer 59. At this point the disc 42 reaches the end of outward travel against the nut 57, and the door 45 may be swung outwardly.

Corresponding with the twenty-six letters of our alphabet and the ten digits of our numerical system, the belt or tape 40 is sound impressed in parallel extending sound tracks 63 as indicated in FIG. 1, the sound of that number or letter impressed on each sound track having been repeated a number of times while the sound track makes a complete revolution, thereby impressing the sound which the child is to match upon the selector keyboard with the corresponding letter or number selected from the book which is followed. A pick-up coil unit 64 is therefore provided for each sound track, and in order to obtain the most effective distribution between time and space limitations as regards width of sound track, diameter of tape or belt, length of housing, arrangement of keyboard, capacity of motor, and speed reduction requirements, an arrangement whereby a pick-up coil unit 64 is three times the width of a single sound track has been arrived at, with the pick-up coil units being arranged in three rows, as shown in FIG. 1.

As shown in FIG. 6, each pick-up coil unit 64 comprises a housing 65 in which a substantially circular metallic magnet 66 is carried with air gap 67 being provided downwardly centrally thereof. Two opposed coils 68 are positioned for the magnet 66 to extend therethrough, adjacent ends of the insulated windings of these coils 68 being shown series connected at 69 with the opposite ends 72, 72' extending out through a suitable opening 70 in the housing 65. The housing 65 is shown made of a plastic as an epoxy resin, and an insert 71 of rectangular cross-section, also of epoxy, is forced into the bottom of the housing 65 to provide shoulders to support the coils 68. As shown in FIG. 6, both the housing 65 and the insert 71 are contoured to the outer periphery of the belt or tape 39 to just clear the iron oxide 40 thereon shown in FIG. 5. The width of the magnet 66 across the face of the air gap 67 is substantially the width, and not less than the width, of a single sound track ring as impressed on the tape or belt 39, as shown in FIG. 7.

Each coil unit 64 has a boss 73 on the upper side of its housing 65 and such boss 73 has a bore 74' therethrough. A rod or bolt 74 is passed through the bosses 73 of a row of coil units 64 and anchored at its ends to clip angles 108 as by peening, such clip angles 108 being affixed to the under side of a plate 109 as by welding, and extending downwardly from the plate 109. The plate 109 is carried concentrically with the cylinder 36 and suspended as shown in FIG. 5, and as will be hereinbelow described. As suspended the plate 109 positions the lower surfaces of the housing 65 and housing insert 71 of each coil unit 64, together with the magnet 66 thereof and the air gap 67 therein between, in closest proximity to the layer of iron oxide 40 on the sound-impressed belt or tape 39 carried by the cylinder 36.

If a coil unit 64 is the width of three sound tracks 63, the width of the air gap 67 of a coil unit will be that of one sound track, and the width of the combined housing 65 and housing insert 71 on either side of the air gap 67 will be the width of one sound track. Consequently, with three rows of coil units provided, successive rows may be staggered one-third the width of a sound track with the consequence that there will have to be spacer blocks or blanks provided to maintain the lengths of the rows equal and continuously extending between the clip angles 108.

For instance, as shown in FIG. 2, the last unit 64' on the front row left will be a blank or spacer unit of two-thirds the width of a standard unit 64. Also there will be a spacer unit of two-thirds the width of a standard unit on the second row right in the space shown vacant behind the right unit of the front row; also in the third row, there will be a blank or spacer unit of one-third the width of a standard unit on the extreme left and, as shown in FIG. 1, the third row right unit 64' will be a spacer or blank unit of one-third standard unit width.

By way of illustration, beginning at the left sound track in FIG. 1, the small figure 2 represents that the sound track over which the right side of the left front row blank unit 64' is disposed is covered centrally by the air gap of the left most second row pick-up coil unit, such unit extending to the left end of the second row and thus being staggered two-thirds of the width of the unit with relation to the first left front row standard unit shown. The small figure 3 in the sound track next adjacent the first sound track 2, represents that this sound track 3 is straddled centrally by the air gap of the left unit in the third row of units, such unit being staggered one-third the width of a unit to the right of the left unit in the second row, and hence one-third of the width of a unit to the left of the left front row unit. The small figure 1 in the third sound track from the left then represents that this sound track is straddled by the first standard left front unit 64.

In corresponding manner, referring to the right front unit, the small figure 1 represents that this sound track 1 is straddled by the rightmost front unit. The sound track 3 immediately to the left thereof, as designated by the figure 3, represents that this sound track is straddled by the standard unit in the third row to the left of the spacer 64'. Also, a sound track 2 represented by the small figure 2 immediately to the left of the small figure 3, represents that this sound track is straddled by the rightmost pick-up coil unit 64 of the second row just left of the spacer which has been omitted from FIG. 1 for purposes of clarity.

It can thus be seen that by arranging the pick-up coil units in rows and by arranging the rows in staggered relationship, a drum or cylinder can be employed within the realms of reason as to length and which may still have enough length to provide sound tracks for all of the letters of the alphabet and digits of a numeral system. At the same time, since each pick-up coil unit must extend over a necessary portion of the periphery of the cylinder or drum 36 as space requirements for a magnet 66 and two coils 68 may dictate, a drum 36 must be provided of sufficient diameter to provide within less than one-fourth of its periphery the peripheral distance as may be covered by the multiple rows of pick-up coil units.

Various conventional means have been employed to reproduce and amplify the voice and thus the means employed herein may be indicated at least in part diagrammatically. In summation the iron oxide layer 40 which is applied to the belt or tape 39 is sensitive to the magnetic flux across the air gap 67 of the magnet 66 as such magnetic flux is created by virtue of the cores of the coils 68 being wound by a multiplicity of turns of the insulated electrical conductors 72 and 72'.

As shown in FIG. 2, each pick-up coil unit 64 is in series with an amplifier 75 which amplifies the voice as it is transmitted from the tape 39 through the iron oxide 40 and the frequency and intonations of the voice are carried to the amplifier by the conductor 72. Circuit is completed to such conductor by pushing a key 76 corresponding with a letter, numeral or character to be matched. Such key 76 has a shaft 77 connected thereto which extends through a bore in a cylindrical housing 78 affixed to the upper portion 79 of the forward panel 23 of the housing 10. Such panel 79 has a bore therethrough in coaxial alignment with the bore in the key housing 78 and the shaft 77 of the key 76 passes through this bore also so that the shaft 77 extends into the interior of the housing 10.

A flange 87 is provided on the shaft 77 within the key housing 78 to bear upon a spring 81 which in turn is based against the panel 79 and surrounds the bore through the panel. Within the housing 10 the shaft 77 has a cam flange 82 thereon which, when moved inwardly, closes a switch 83 in the conductor line 72 and which also moves over a latching switch 84 to latch thereagainst. Such shaft 77 when in latched position pushes against a master plate 85 to close a switch 86 for purposes to be hereinbelow explained. When the cam flange 82 of a key 76 closes switch 83 circuit is completed through a pick-up coil unit 64 corresponding with the sound to be designated by the selection of such key 76 and as the closing of the switch 86 causes the motor 15 to revolve and revolve the drum 36, the sound track centrally below that pick-up coil 64 through which circuit has been closed will transmit the sound impressed on through the pick-up coil to the amplifier.

As such sound tracks have been repetitively impressed with the object of impressing upon the mind of the pupil the audible sound of the letter, numeral or character corresponding with the selected indicia, then within the course of a revolution, or within the course of a selected multiplicity of revolutions of the cylinder corresponding to the degree the cylinder 36 has been geared down to revolve in proportion to the speed of the motor 15, a number of repetitions of the corresponding audible sounds can be obtained on a drum 36 as designed in accordance with the object of providing ample peripheral space for a multiplicity of rows of pick-up coil units.

As is well known in the transmission of sound as voice, it is conventional to impress the voice on a plastic belt or tape as is done daily on tapes receiving dictation to be transcribed by secretaries from belts as played back by machines such as dictaphones, ediphones and similar voice reproducing devices.

The time required for the cylinder 36 to make a revolution or a predetermined number of revolutions may be known and with this time known any actuation of a pick-up coil unit to transmit the sound on any sound track may be standardized by providing a time out motor 15 which runs to revolve the cylinder 36 just ample time to reproduce the impressions on any one sound track and then cuts off. As shown in FIGS. 2 and 4, this is accomplished by providing a master plate 85 mounted on springs 88 inside of the panel 79. Any inward movement of any key against the plate 85 above the central spring 88 causes that part of the plate 85 to move inwardly and close an upper master switch 86 in a circuit extending from the side 116 of the power line. As this occurs the plate 85 compresses the spring 88 on the opposite side of the center spring 88 from that part of the plate 85 which is moved inwardly. Conversely, any inward movement of any key against the plate 85 below the central spring 88 causes that part of the plate 85 to move inwardly and close a lower master switch 86 and the plate 85 thus pivots about the center spring 88 so that the upper part moves outwardly and compresses the upper spring 88. For this reason only two master switches 86, an upper switch and a lower switch, are needed in parallel circuits 210 to cut in the time lapse cycle as will be hereinbelow described. The circuit 90 is in series with the two parallel circuits 210 each including a switch 86 as aforesaid. Also the circuit 90 includes in series a light 87 and a solenoid 97 and circuit to the opposite side of the power line is closed by a double throw switch 91, such switch being of the type normally held by a spring 92 in the position shown in FIG. 2 and against the stop 93. The switch 91 in turn connects to the opposite side 115 of the power line.

A time-out motor 15 is shown having one end of its shaft comprising a clutch 94 and a clutch 95 on a time-out shaft 96 is mounted by conventional means to be moved into engagement with the clutch 94 as actuated by a solenoid 97 in the line 90. Upon solenoid actuation, as when the switch 86 is closed by plate 85 when a key 76 is punched, the shaft 96 is thrown into clutch engagement with the shaft 94. At the same time the switch 106 has been closed to cause the motor 15 to rotate continuously during a training period. The motor 15 will then rotate the shaft 94 and through it the shaft 96. Such shaft 96 has an arm 98 affixed thereto and normally held at a predetermined initial position by a spring 99 and a stop 100. The setting of angular travel that the arm 98 is to make with relation to an arm 101 which floats on the shaft 96 may be predetermined and such angle as selected determines the time the motor 15 will rotate the clutched shafts before the arm 98 strikes the arm 101 and times-out, the arm 101 in turn being urged against the switch 91 to shift it from the position shown in FIG. 2 to the opposite pole to close circuit to the conductor 102 and solenoid winding 103 and solenoid 104 and back to the opposite side of the power line. Thus when the motor 15 rotates the clutch shaft 96 until the predetermined time lapse has transpired corresponding to the travel of the arm 98 which in turn corresponds with the predetermined rotation of the cylinder 36 to reproduce all of a single sound track, the time lapse arm 98 contacts the switch shift arm 101 to throw the switch 91 to the upper position as shown in dotted lines in FIG. 2, and the solenoid 103 is energized so that its armature strikes the master plate 85 and urges the shaft 77 of the punched key 76 outwardly and over the latching switch 84 to move the key shaft 77 to unlatched position while at the same time the normally open switches 83 and 86 may open.

This breaks circuit through the solenoid 97 so that it declutches the shaft 96 and the torsion spring 110 on such shaft 96 returns it to initial position and brings the arm 98 against the stop 100. This stops the cylinder 36 from rotating as the shaft 96 of the motor is that shaft which engages transmission to rotate the upper shaft 17 of the speed reducer which in turn through transmission rotates the lower speed reducer shaft 18 on which the friction pinion 19' is mounted which meshes with the friction wheel 19 on the shaft 20 while the shaft 20 in turn meshes with the planetary pinions 32 which turn the cylinder 36 as aforesaid.

At this juncture all circuits except the circuit through the motor 15 are open, such motor circuit remains closed as long as the magnetic switch 106 is turned to closed position. Unless, however, the motor 15 should be left running too long a time without any additional selections being placed upon the the selector keys 76 in which case time elapses for the delayed action double acting solenoid 104 to react and open the switch 105 thereby stopping the motor 15 and allowing the normally open magnetic switch 106 to open. The stopping of the motor will thus be indicated by the light 107 going out whereby the switch 106 will open until again manually closed.

In regard to the type of indicia which may be employed a standard typewriter keyboard arrangement is shown in FIG. 1 with the exception that a key for the number 1 is added to the top line to the left of the numeral 2. The manner in which the switches 83 may be connected with the pick-up coils 64 is open to a wide range of choice, a practical way being to divide the keyboard in half along a vertical line so that the switches of the keys on the left connect with the pick-up coil units on the left and the switches of the keys on the right connect with the pick-up coil units on the right.

Also by further division the switches of the lower keys on the left may connect with the pick-up coil units of the lower and part of the center row of pick-up coil units on the left, and the lower key switches on the right may connect with the lower row and part of the center row pick-up coil units on the right; conversely for the upper key switches and for the upper and part of the center row pick-up coil units may be connected in corresponding manner. This method of connection is indicated graphically by four conductor outlets being shown in FIG. 1 extending through the plate or head 109. Such conductor outlets receive the conductors 72, 72' from the pick-up coils 64 beneath the plate 109, the outlets on the left being designated by reference numerals 111 and 113 and those on the right being designated by reference numerals 112 and 114. Flexible conduits, not shown, may connect to the outlets 113 and 114 through the plate 109 and extend downwardly and under the cylinder 36 and forwardly to points of anchorage on the side panels 29 and 37 adjacent the lower part of the selector keyboard for distribution of the conductor wires 72, 72'. On the other hand flexible conduits not shown may connect to the upper outlets 111 and 112 and extend sidewardly therefrom along the side panels 37 and 29 forwardly to points of anchorage below the lid 12 and adjacent the upper parts of the selector keyboard for distribution. From these points of anchorage the conductors 72' from the individual pick-up coils may be joined and a common connection made to one side 115 of the power line while the conductors 72 from each coil may connect into one side of the individual switch 83 for each coil.

The conductors from the other side of such switches 83 are tied together in parallel and such parallel lines connected in series with one side of a single amplifier 75, the other side of which connects into the opposite side 116 of the power line.

In the process of teaching a book may be provided as shown in FIG. 3 depicting various animals such as the horse, dog and cat as shown with the spelling therefor printed underneath the pictorial designation. The child in training must punch in sequence each individual letter spelling a selected word; provided, however, that he must listen after correctly selecting a matching letter until the cylinder rotates for that revolution or multiple of revolutions for which it is set to rotate to repeat the contents of the corresponding sound track. For instance, if the pupil wants to spell "horse" and hear the sound of each letter repeated over and over again until he is familiar with the letters and their sequence, he must accurately press in order on the selector keyboard the letter "h" and hear it played back, then the letter "o" and hear it played back, and then the letter "r" and hear it played back, and after that the letter "s" and hear it played back, and finally the letter "e" and hear it played back.

In case it may be desired to familiarize the pupil with the appearance of any letter in both capital and lower case forms and both in print and in script, the key may be provided with a cover 76' as shown in FIG. 2 having indicia thereon as shown in FIG. 15.

In case the pupil has advanced from a study of letters and numerals to a study of words, the letters and numerals may be removed from the selector keyboard and the key covers 76' replaced with covers 76' having words thereon. In this case a belt or tape sound impressed with words corresponding with indicia replacing the letters and numbers on the selector keyboard may be installed thereon. FIG. 14 shows such a cover 76' having a word instead of a letter thereon.

The belt previously employed must then be removed and replaced and the newly installed sound impressed belt must have words impressed thereon in sequence corresponding with the wiring between the pick-up coil units and the new indicia on the selector keyboard to which the sound impression corresponds.

In order to remove the belt 39 it is necessary to lift the plate 109 to position the pick-up coil units 64 out of contact with the belt 39 to be removed. In order to accomplish this, a bridle 117 comprising four cables 118 having their ends connected to eyelets 119 in the top of each corner of the plate 109 is provided, the cables 118 being of substantially equal lengths and being tied together at 120 and continuing as a single cable 121 over a pulley 122 near the top of the rear panel 123 of the housing 10 as shown in FIGS. 1 and 4.

Referring now particularly to FIG. 4 and FIG. 5, the cable 121 extends downwardly and passes under a pulley 124 mounted on the housing floor 24 and from thence the cable 121 passes on the inner side of a pulley 124' which extends out sidewardly from the rear panel 123 as best seen in FIG. 8. The cable terminates in the lower end of a stop lever 126 which is bent as shown in FIG. 8 to extend first in substantially the same plane from the hinge 80' to which it is connected inside the side panel 37 and within a slot 127 provided therein, such slot 127 being occluded outwardly by the hinge 80'. Within the side panel 37 the stop lever 126 provides a downwardly extending arm 128 and a connection button 129 at the lower end thereof to which the cable is fastened.

Prior to setting forth description of how the opening of the door 45 lifts the plate 109 so that the pick-up coil units 64 may clear the belt 39, attention is called to the fact that the plate 109 is held in balance against springs 206 and 207, of substantially equal length and tension, which have ends connected to eyelets 119 on the respective upper and lower edges of the plate 109 while the opposite end of the upper spring 206 is connected to the top of an upright 208 and the opposite end of the lower spring 207 is connected to the eyelet 119' which extends outwardly from the rear panel 123.

As shown in FIG. 8, the door panel 46 is closed and the door is in latched position as shown in FIG. 5. However, when the door is to be opened by turning the knob 48, as aforesaid, when the door assembly 45 is swung outwardly the latch lever 126 moves from the position shown in solid lines in FIG. 8 to the position shown in dotted lines therein and thus the cable 121 is moved in direction to shorten the distance between the bridle center 120 and the pulley 122 thereby to lift the plate 109 and therewith to lift the pick-up coil units 64 out of contact with the belt 39. Since the belt 39 is longer than the cylinder 36 and extends from its point of bearing at the inner end against the bracket 22 to its point of bearing at its outer end in the base of the counterbore 129 in the door flange 47, when the door 45 is opened enough of the belt 39 overextends the cylinder 36 to permit the outer end of the belt to be manually grasped for easy removal. In the meantime the cylinder 36 remains supported by its contact with the planetary pinions 32. Thus a new belt 39 may be inserted through the bore 38 in the side panel 37 and over the cylinder 36 and thereafter the door 45 may be closed to place the disk 42 in position to further support the cylinder for rotation as best seen in FIG. 5.

A modification of the invention is shown in FIGS. 9–13 in which a standard typewriter keyboard arrangement may be followed or in which the letters or numerals or indicia installed as the selector keyboard may be arranged in any pattern. The arrangement is such, however, that only one key may be punched at a time. To effect this arrangement a housing 130 of which front panel 131, side panel 132 and rear panel 133 are shown in FIG. 10, has its key heads 134 on push levers 135 which extend through slots 193 in the front panel 131 and through a guide plate 136 which is rigidly fixed at each end to the side panel 132. The push levers 135 extend through slots 137 provided in a master cam plate 138 and such push levers have respectively upper and lower ears 139 and 140 thereon through which are threaded set pins 141 and 141'.

Each push lever 135 has the line in the vertical plane which joins the inner ends of the upper and lower set pins extending at a different angle than the line joining the inner ends of the upper and lower set pins for any other push lever 135. This is accomplished by varying the relative distances at which the upper and lower set pins 141, 141' for each push lever 135 extend through their respective eyelets 139 and 140. If no push lever 135 has been pushed inwardly the master cam plate 138 which is pivoted on a pivot pin 142 journalled in the opposed side panels 132 would tend to extend vertically. However, when a key 134 is pushed so that the key head moves inwardly adjacent the front panel 131, as shown in FIG. 9, the push lever 135 moves rearwardly until its set pins 141, 141' strike the master cam plate 138 to extend it at that predetermined angle determined by a line joining the inner end of such set pins. The master cam plate 138 carries with it a needle 143 which follows the various angles at which the master cam plate will be set corresponding to say the twenty-six letters of our alphabet and the ten digits of our numeral system which can be taught by the herein invention. As the pivot rod 142 on which the cam plate is centrally mounted is journalled in the side panels 132 thus to remain in the same vertical position, the point of the needle 143 thus describes an arc in a vertical plane in the course of moving through the sequence of various angles at which the cam plate 138 may extend in correspondence with the various characters to be taught. Thus a sound impressed cylinder 144 is provided with sound tracks of limited width comprised of parallel extending grooves impressed thereon, one groove being sound impressed for each character to be taught.

The cylinder 144 is supported at its ends by brackets 145 in which its ends are journalled for rotation, one end extending outwardly of the left bracket 145 and being threaded to receive a nut thereon which is pinned to the end of the cylinder while the other end of the cylinder extends through the right bracket 145 in which it is journalled and is connected to one end of an inter-telescoping shaft 146 by a universal joint 147. The two inter-telescoping shaft sections of the shaft 146 are prevented from relative rotation by means of a key and key way respectively provided thereby. The cylinder is prevented from further axial movement with relation to the brackets 145 by a pin 148 through the right end of the cylinder. The right end of the inter-telescoping shaft 146 is connected by means of the universal joint 149 to a motor 150 that will be hereinafter described.

The brackets 145 which support the cylinder 144 extend upwardly from a bridge 151 which has the armature of a solenoid 152 connected centrally thereto, such solenoid 152 being housed in a receptacle 153 connected into a base 154 and extending therebelow.

The base 154 has two opposed tubes 155 mounted thereon, and such tubes have slots 156 therein through which extend threaded shanks 157 which connect the bridge 151 to cylindrical plungers 158 which ride within the tube 155 as balanced between relatively strong springs 159 which bear upwardly against the upper closures of the tubes and downwardly upon the plungers and weaker springs 160 which bear upwardly against the plungers and downwardly against the lower closures 161 of the tubes 155.

Each push lever 135 has a slot 162 therein through which passes the pivot rod 142 on which the master cam plate 138 is pivoted. Each push lever 135 also carries a leaf spring latch 163 curved and tempered to latch over the pivot rod 142 when the push lever 135 carrying such latch 163 is pushed inwardly. A coil spring 164 which bears rearwardly against a keeper tube 165 affixed to the rear panel 133 bears forwardly against the push lever 135 and extends around a guide pin 166 which extends rearwardly from the push lever. Thus when the push lever 135 is pushed inwardly it is yieldably held in latched position by the leaf spring 163 as opposed by the coil spring 164.

The housing 130 has a latch cam plate 167 pivotally mounted therein with pivot pin 194 journalled in the opposed side panels 132. Each push lever 135 has a cam lug 168 thereon which strikes the latch cam plate 167 as it moves inwardly and pivots the plate 167 about its pivot 194 and thus positions it to close a master switch 169 which closes a time lapse circuit 220 containing in series therein a guide light 171 and a solenoid 172. The solenoid 172 actuates a shaft 96 to move longitudinally to engage a clutch 95 on the end thereof into clutched position with a clutch 94 on the end of the shaft of the motor 150. Such shaft 96 has a time lapse arm 98 thereon which may be set to travel a predetermined angular distance before it contacts the arm 101 on such shaft 96 to move such arm 101 to throw the switch 91 from the position shown in FIG. 9 to lower position to close contact with the conductor 174, as shown in dotted lines in such FIG. 9. When the switch 91 is thus shifted the solenoid 172 is de-energized and de-clutches the shaft 96 whereby the torsion spring 110 returns the shaft 96 to an initial position while the spring 99 pulls the time lapse arm 98 also back to initial position with relation to the arm 101 and against the stop 100.

When the switch 91 closes contact with the circuit 174 it breaks the circuit 220 containing the solenoid 172 and the switch 169 therein while the circuit 174 has a solenoid 175 therein which is energized to act against the cam plate 167 to urge against the cam lug 168 to force it outwardly thereby unlatching the leaf spring 163 from the pivot pin 142 so that the spring 164 may return it to outermost position and whereby the normally open switch 169 may open.

Prior to the breaking of the time lapse circuit 220, the closing of the switch 169 as the leaf spring 163 latches the push lever 135 in rearward position to close a switch 199 and to extend over a latching spring 212, has resulted in closing a sound reproduction circuit 221 which has therein a solenoid 152 which lifts upwardly the bridge 151 and the cylinder 144 carried thereby to bring against the cylinder needle 143 that groove 200 in the cylinder 144 corresponding with the longitudinal sound track reproduction position of the needle 143 as established by relation of the length of the grooved cylinder 144. Since the travel of the bridge 151, as carried by the solenoid 152, must vary as the needle is contacted in different longitudinal positions in the vertical plane arc in which it moves, compensation may be afforded as will be set forth hereinbelow, such compensation being in addition to the counterpoised springs 159 and 160 so that in all cases the cylinder 144 is urged against the needle with substantially equal force. With this accomplished the sounds repeated back will be of equal tone and volume for each groove 200 and so that the cylinder will not be urged so forcefully against the needle point that it will be re-grooved and the sound impressed thereon destroyed.

This balance and avoidance of re-grooving may be accomplished as shown in FIG. 11 by providing a pivot pin 202 in the cam plate 138' and by hinging a hinge 176 thereto so that the hinge 176 may be pivoted on such pivot pin 202. Such hinge 176 carriers a needle 177 of configuration as shown so that the needle extends angularly from a cylindrical shank 178 which extends through a bore 179 through the hinge 176, the upper end of the shank 178 being threaded to receive a nut 180 thereon which locks the needle 177 to the hinge 176 at the junction point of the angular extending lower part of the needle while the shank 178 bears against the under surface of the hinge 176.

A keeper tube 181 may be installed on a projection 182 extending from the cam plate 138' to receive the upper end of a spring 183 therein, the upper end of such spring being physically connected to such projection 182. Also a guide stem 184 may be provided to extend from the hinge 176 upwardly toward the projection 182, such stem 184 being of lesser diameter than the inside of the coil spring 183. By this arrangement the needle 177 is also yieldably mounted as well as the bridge 151. At the same time the needle is easily accessible to be changed.

Referring to FIG. 12, a needle 185 is shown of conical shape to extend through an oblique frusto-conical bore 186 in the master cam plate 138'. Such needle has a cylindrical upper end 187 which is received within a tube 188 having a spring 189 therein to bear downwardly upon a washer 190 which seats on the head of the needle and to bear upwardly against a retainer ring 191 at the top of the tube 188. The tube 188 is threadable into a cup 192 which is rigidly fixed to the cam plate 138'. When it is desired to change needles, a keeper pin 195 is inserted through the opposed holes 201 in the tube 188 to retain the spring 189 therein. The tube 188 is then unthreaded from the cup 192 and after this the needle 185 may be removed and another needle inserted in its place in the bore 186 and the tube 181 threaded back into the cup 192 and the keeper pin 195 withdrawn.

As set forth hereinabove in both forms of the invention no way has been described whereby if the pupil makes a mistake in matching indicia there is any way to prevent the wrong sound from being played back to him. However, in the form of the invention shown in FIGS. 1–8 provision can be made to avoid this in the form of a master keyboard which may be installed on the sloped panel section 196 of the front panel 79 shown in FIG. 1.

This master keyboard, indicated in FIG. 1 and shown in cross-sectional detail in FIG. 2, need not follow the typewriter keyboard arrangement shown immediately above but may follow the letters of the alphabet in order with the digit numerals also being in order. In this case a master key 197 corresponding with any character to be matched may be pressed so that the shank 77' thereof moves inwardly to move a cam flange 81' to latch over a latch cam 82' and to close a switch 83' which is in series with the corresponding pick-up coil 64 corresponding with the matching character on the selector keyboard thereabove. Such switch 83' is disposed in circuit between the switch 83 adjacent the corresponding selector key 76 and the conductor 72 extending from the right coil 68 of the pick-up coil unit 64 of the matching character. Thus if the pupil should select a wrong selector key not in correspondence with the master key indicia to be matched, no circuit to the pick-up coil for the character erroneously punched will be closed although the plate 85 may have been moved to close a switch 86 to complete circuit to engage the clutch of the shaft 96 and set the motor 15 in operation over a time lapse period. In this case the cylinder 36 simply revolves its time lapse cycle but no sound is omitted. This is true because the circuit through the pick-up coil unit 64 for the character erroneously punched remains open, since the master key corresponding with the erroneously punched selector key has not been punched to close such pick-up coil unit circuit. However, at the end of time lapse of the silent cycle the switch 91 is thrown to close circuit to energize the solenoid 103, as in all cases, whereby the master plate 85 unlatches the erroneously punched key. On the other hand the master key 197 of the indicia to be matched remains latched in punched position with its shank 77' in contact with the master cam plate 85' until the proper or matching selector key 76 has been located and pressed whereby circuit is closed through the proper pick-up coil unit 64 by virtue of the master key switch 83' being closed.

The pupil now hears repeated to him during the time lapse cycle the sound corresponding to the indicia selected on the master keyboard and matched on the selector keyboard. At the end of the time lapse cycle the solenoid 103' is also energized since it is in series in the restoration circuit 222 with the solenoid 103, and when energized temporarily the armature of the solenoid 103' strikes the master plate 85' mounted on springs 88 correspondingly as the plate 85 is mounted, and the plate 85' moves outwardly to unlatch the master key 197.

In the form of the invention shown in FIGS. 9–13, a master keyboard corresponding with the master keyboard shown in FIG. 2 is provided whereby provision can also be made so that no errors in punching a key not matching with the selected master key indicia will be repeated in sound as the circuit between the solenoid 152 and the return side 116 of the power line may have a normally open switch 199 therein which is only closed when the proper leaf spring 163 latches over the pivot rod 142. Then since the selected master key 197 has closed its switch 83' which switch is in series with that switch 199 which the proper leaf spring 163 now closes, and since the switches 83' and 199 are also in series with the solenoid 152, the closing of such switch 199 results in the energizing of the solenoid 152 to raise the bridge 151 to place the proper groove 200 in operative contact with the needle.

In detail there is a switch 83' provided for each master key in each form of the invention, which switch is in series with the proper pick-up coil unit 64 in the form of the invention shown in FIGS. 1–8, and which switch is in series with a switch 199 closed by the proper leaf spring 163 in the form of the invention shown in FIGS. 9–13. Thus the punching of a proper or matching selector key in the form of the invention shown in FIGS. 1–8 actuates the time lapse cycle while at the same time circuit is completed through the proper pick-up coil unit. In the form of the invention shown in FIGS. 9–13 the punching of a proper or matching selector key closes circuit to the solenoid 152 which lifts the cylinder 144 into needle contacting position while at the same time the switch 169 has been closed to complete circuit for the time lapse cycle of the motor.

On the other hand if the wrong selector key 76 is punched in the form of the invention shown in FIGS. 1–8, no circuit is completed through the pick-up coil unit 64 corresponding with the selector key punched, and although the time lapse cycle of cylinder revolution takes place, no sound is played back. Also, if the wrong selector key 134 is punched in the form of the invention shown in FIGS. 9–13, circuit is not completed to the solenoid 152 so that the bridge 151 does not raise the cylinder 144 into needle contacting position during the occurrence of the time lapse cycle.

Thus in the form of invention shown in FIGS. 1–8, corresponding pick-up coil units, switches 83', and switches 83 are in parallel lines, all of which are in series with the amplifier 75, while at the end of the time lapse cycle the solenoid 103 is in series with the solenoid 103' which is actuated at the end of time lapse to unlatch any latched master key 197.

In like manner, in the form of invention shown in FIGS. 9–13, corresponding switches 83' and 199 are in parallel, all of such parallel lines in turn being in series with the solenoid 152.

In each form of the invention a light as provided in series with the switch 83' and adjacent thereto to designate which master key 197 has been selectively punched.

As shown in FIG. 1, the front panel 23 may provide a panel board 213 through which may be seen the light 107 which designates that the motor 15 is running and the light 87 which designates that the cylinder 36 is turning through its time cycle. Also the master keyboard has a light 198 beside each master key 197 to accentuate the master key which the pupil is tasked with matching on the selector keyboard. Also such panel board 213 has accessible therein the magnetic switch 106 which turns off when the delayed action, double acting solenoid 104 is energized to throw the switch 105, later to be de-energized by such double action so that the switch 105 again closes whereas the magnetic switch 106 remains open until it is again manually closed.

The panel board 213 also has accessible therein the adjustment knob 215 through which the speed reduction ratio between motor 15 and speed reducer 16 may be varied, and also the adjustment knob 216 by which the time lapse cycle of the motor 15 may be varied. By the co-ordination of these two adjustments, time lapse cycle and cylinder rotation may be brought into coincidence.

Similarly a panel board for the form of invention shown in FIGS. 9–13 would display the light 217 which designates that the motor 150 is running, and it would also display the light 171 which would designate that the cylinder 144 is turning through its time lapse cycle. Also such panel board would have accessible the magnetic switch 106 corresponding in function to the magnetic switch 106 in the form of invention shown in FIGS. 1–8, and additionally such panel board would have therein the adjustment knob corresponding with the adjustment knob 215 for the ratio of the speed reducer 219 and the adjustment knob 216 for the adjustment of the time lapse cycle of the motor 150. On such panel board the elements aforesaid would be arranged correspondingly as shown in FIG. 1.

In the form of the invention shown in FIGS. 9–13, it is possible to have the rear parts of all push levers 135 to extend in parallel so that only a single plate 138 may be required. This is true since the limiting dimension of width need be the diameter of the keeper tube 165 for the spring 164 which extends around the guide prong 166 from the rear of each push lever 135. As this spring 164 need be of relatively small diameter and as the keeper tube 165 may be of the thinnest wall thickness, the limiting dimension for each character in width need be no more than ¼ of an inch. At the same time the characters to be punched may be arranged in three or four rows as desired and the exact typewriter keyboard arrangement may be followed if desired, as the parts of the push levers 135 between the front panel 131 and the guide plate 136 may be offset in various patterns to achieve this arrangement as shown in FIG. 10 by the lever portions 135a, 135b and 135c.

The invention is not limited to the structures shown hereinabove and to the exact methods of teaching hereinabove described. Rather the invention takes in any structure and means of teaching whereby the pupil is shown certain letters, numbers, words, characters or indicia either in a book, on display cards or on a master keyboard and is required to match them on a selector keyboard whereby if proper selection is made there will be repeated the audible sounds corresponding with the indicia which has been matched.

Therefore the structures hereinabove described and disclosed in the drawings and the teaching methods set forth should not place limitation on the extent of the invention but numerous other structures and methods are included as long as such may fall within the broad spirit of the invention and within the broad scope of interpretation claimed for and merited by the appended claims.

What is claimed is:

1. A teaching device comprising parallel extending sound tracks to emit the sounds impressed thereon, a master keyboard having keys thereon impressed with various indicia to be matched, a selector keyboard having keys thereon impressed with corresponding indicia, a parallel sound reproducing circuit for each indicia with each parallel circuit including a switch latched closed by a master key and a switch in series circuit therewith latched closed by a selector key with indicia in correspondence with the indicia of said master key, and a light in series with said latched switches and adjacent the punched master key to designate it as that master key to be matched, a first means conditioned for the reproduction of a corresponding sound track by the closing of any selector key switch to match a previously closed master key switch, means in series with said sound reproducing circuits to amplify said reproduced sound, a drive circuit in parallel with said sound reproducing circuits and comprising therein a variable speed time lapse motor including an adjustable speed reduction means and means driven thereby to cooperate with said first means to selectively reproduce said sound tracks, a control switch to be opened to break said drive circuit, a light to indicate said drive circuit is closed, and a magnetic switch held closed when said control switch is closed and openable when said control switch is opened, time lapse circuit means in parallel with said sound reproducing circuits and said drive circuit and including in series therein latch switch means actuated by the closing of said matching selector key switch as aforesaid to close said time lapse circuit means, means to enclutch said motor to adjustable time lapse means included by said motor whereby said time lapse means runs for a predetermined time lapse cycle corresponding to the period of reproduction of a sound track, a light to indicate the occurring of a time lapse cycle, and a time lapse switch actuated by said time lapse means to break said time lapse circuit at the end of time lapse cycle, restoration circuit means in parallel with said time lapse circuit and closed by said time latch switch at the end of time lapse cycle, said restoration circuit including in series therein means to break the reproduction circuits comprising means to unlatch the last master key punched and means to unlatch the matching selector key punched corresponding to the punched master key, and a double acting, delayed action solenoid operable a predetermined time interval after said restoration circuit is closed to open said control switch and thereafter to close it, said magnetic switch being de-magnetized upon the opening of said control switch to be returned to normal open position.

2. A teaching device comprising parallel extending sound tracks to emit the sounds impressed thereon, a master keyboard carrying indicia to be matched, a selector keyboard included by said device and having keys thereon impressed in correspondence with the indicia to be matched, said device also including a parallel sound reproducing circuit for each indicia including a switch latch closed by the punching of a matching selector key corresponding to the indicia to be matched, a first means conditioned for the reproduction of a sound track in correspondence with the matched indicia, a drive circuit in parallel with said sound reproducing circuits and comprising therein a time lapse motor including means driven thereby to cooperate with said first means to selectively reproduce said sound tracks, and a switch openable and closable to close and break said drive circuit, time lapse circuit means including adjustable time lapse means, said time lapse circuit means being in parallel with said sound reproducing circuits and said drive circuit and including in series therein latch switch means actuated by the closing of said matching selector key switch as aforesaid to close said time lapse circuit means, means to enclutch said motor to adjustable time lapse means included by said motor whereby said time lapse means runs for a predetermined time lapse cycle corresponding with the period for reproducing a sound track, and a time lapse switch actuated by said time lapse means to break said time lapse circuit at the end of a time lapse cycle, restoration circuit means in parallel with said time lapse circuit and closed by said time lapse switch at the end of time lapse cycle, said restoration circuit including reproduction circuit breaking means therein comprising means to unlatch matching punched selector keys.

3. A teaching device comprising a master keyboard and a selector keyboard with matching keys, parallel circuit means connecting said matching keys, an individual sound track means impressed to emit the sound corresponding to each selector key manipulation when the selected key matches a previously manipulated master key, motor means to actuate said sound track means to play, a master circuit in series with said motor means and with said parallel circuit means, a master circuit closing means to close said series circuit upon each selector key manipulation, means set operable responsive to selector key manipulation to match a respective master key to play said sound track to emit the respective sound designated by the matched keys, and whereby if a selector key is manipulated which does not match the designated master key the sound track emits no sound, and time control means operative at the end of a predetermined time lapse interval to stop said motor means and to restore said selected and master keys to unmanipulated position.

References Cited in the file of this patent
UNITED STATES PATENTS

| | | |
|---|---|---|
| 1,862,872 | Vincent | June 14, 1932 |
| 2,547,603 | Segal et al. | Apr. 3, 1951 |
| 2,855,703 | Stanton | Oct. 14, 1958 |
| 2,983,053 | Bartholomew et al. | May 9, 1961 |